United States Patent
Kim et al.

(10) Patent No.: US 7,483,719 B2
(45) Date of Patent: Jan. 27, 2009

(54) METHOD FOR GROUPING TRANSMISSION ANTENNAS IN MOBILE COMMUNICATION SYSTEM INCLUDING MULTIPLE TRANSMISSION/RECEPTION ANTENNAS

(75) Inventors: Eung-Sun Kim, Suwon-si (KR); Jong-Hyeuk Lee, Seongnam-si (KR); Jae-Hak Chung, Seoul (KR); Ho-Jin Kim, Seoul (KR); Joo-Hwan Chun, Daejeon (KR); Kyung-Chun Lee, Daejeon (KR); Il-Han Kim, Daejeon (KR)

(73) Assignees: Samsung Electronics Co., Ltd. (KR); Korea Advanced Institute of Science and Technology (KAIST) (KR)

( * ) Notice: Subject to any disclaimer, the term of this patent is extended or adjusted under 35 U.S.C. 154(b) by 501 days.

(21) Appl. No.: 10/988,947

(22) Filed: Nov. 15, 2004

(65) Prior Publication Data

US 2005/0128983 A1    Jun. 16, 2005

(30) Foreign Application Priority Data

Nov. 13, 2003    (KR) ............... 10-2003-0080354

(51) Int. Cl.
 *H04M 1/00* (2006.01)
(52) U.S. Cl. ............ 455/562.1; 455/101; 455/25; 375/267; 370/334; 342/350; 342/367
(58) Field of Classification Search ........ 370/310, 370/334; 455/452.1, 452.2, 63.4, 562.1, 455/454, 522, 101, 70; 375/267; 342/350, 342/367
See application file for complete search history.

(56) References Cited

U.S. PATENT DOCUMENTS

| | | | | | |
|---|---|---|---|---|---|
| 5,056,109 | A | * | 10/1991 | Gilhousen et al. | 370/342 |
| 5,566,209 | A | * | 10/1996 | Forssen et al. | 375/262 |
| 6,094,165 | A | * | 7/2000 | Smith | 342/373 |
| 6,192,256 | B1 | * | 2/2001 | Whinnett | 455/562.1 |
| 6,369,758 | B1 | * | 4/2002 | Zhang | 342/383 |
| 6,636,568 | B2 | * | 10/2003 | Kadous | 375/225 |
| 6,762,717 | B2 | * | 7/2004 | Hirabe | 342/368 |
| 6,788,250 | B2 | * | 9/2004 | Howell | 342/372 |
| 6,801,790 | B2 | * | 10/2004 | Rudrapatna | 455/562.1 |
| 6,862,271 | B2 | * | 3/2005 | Medvedev et al. | 370/329 |
| 7,006,848 | B2 | * | 2/2006 | Ling et al. | 455/562.1 |
| 7,054,664 | B2 | * | 5/2006 | Nagaraj | 455/562.1 |

(Continued)

FOREIGN PATENT DOCUMENTS

JP          60-92632 A    5/1985

*Primary Examiner*—Sharad Rampuria
(74) *Attorney, Agent, or Firm*—The Farrell Law Firm, P.C.

(57) ABSTRACT

Disclosed is a method for configuring transmission antenna groups in a mobile communication system with multiple transmission antennas and multiple reception antennas. The method includes the steps of: receiving a first matrix having a size of '$N_r \times N_t$', which corresponds to $N_t$ number of transmission antennas, fedback from the mobile terminal, generating combinations of sub-matrixes of the first matrix corresponding to $N_r$ number of reception antennas, and calculating sums of maximum eigenvalues; determining combinations of the sub-matrixes having a maximum value from among the calculated sums of eigenvalues to be transmission antenna groups for the $N_t$ number of transmission antennas; and transmitting different relevant symbols from each other through the transmission antenna groups.

8 Claims, 5 Drawing Sheets

U.S. PATENT DOCUMENTS

| | | | |
|---|---|---|---|
| 7,120,199 B2 * | 10/2006 | Thielecke et al. | 375/267 |
| 7,130,580 B2 * | 10/2006 | Alexiou et al. | 455/39 |
| 7,151,951 B2 * | 12/2006 | Goransson et al. | 455/562.1 |
| 7,181,167 B2 * | 2/2007 | Onggosanusi et al. | 455/63.1 |
| 7,206,606 B2 * | 4/2007 | Kobayashi et al. | 455/562.1 |
| 7,248,879 B1 * | 7/2007 | Walton et al. | 455/452.2 |
| 7,340,248 B2 * | 3/2008 | Kawasaki et al. | 455/423 |
| 7,412,212 B2 * | 8/2008 | Hottinen | 455/101 |
| 2003/0087673 A1 * | 5/2003 | Walton et al. | 455/562 |
| 2003/0125040 A1 * | 7/2003 | Walton et al. | 455/454 |
| 2003/0130003 A1 * | 7/2003 | Won | 455/522 |
| 2004/0209579 A1 * | 10/2004 | Vaidyanathan | 455/101 |
| 2005/0085195 A1 * | 4/2005 | Tong et al. | 455/101 |

* cited by examiner

METHOD FOR GROUPING TRANSMISSION ANTENNAS IN MOBILE COMMUNICATION SYSTEM INCLUDING MULTIPLE TRANSMISSION/RECEPTION ANTENNAS

PRIORITY

This application claims priority to an application entitled "Method for Grouping Transmission Antennas in Mobile Communication System Including Multiple Transmission/Reception Antennas" filed in the Korean Intellectual Property Office on Nov. 13, 2003 and assigned Serial No. 2003-80354, the contents of which are incorporated herein by reference.

BACKGROUND OF THE INVENTION

1. Field of the Invention

The present invention relates to a method for grouping multiple transmission antennas to increase communication capacity in a mobile communication system which includes multiple transmission antennas and multiple reception antennas.

2. Description of the Related Art

Conventional mobile communication systems have been developed mainly for voice transmission with a channel coding technique used to overcome the deterioration of channels in a radio environment. However, current mobile communication systems do not have the capacity to transmit high quality multimedia in addition to voice. As a result, current channel coding schemes that need to transmit more and more data in the same amount of data are pushed to operational limits and cannot satisfy the need for greater data transmission at a lower error rate. Faster data transmission in a forward link is particularly important when there is a rapid increase in the amount of data requested.

Many studies have been conducted to find ways of increasing communication capacity in mobile communication systems and enable faster data transmission. As a result, a multi-input multi-output (MIMO) technique using multiple transmission/reception antennas was established. According to the MIMO scheme, each transmitter and receiver in a network includes multiple antennas to transmit different data to and from each other.

With regard to the MIMO scheme, a construction of a transmitter according to a spatial multiplexing scheme will be described with reference to FIG. 1A, and then a construction of a transmitter according to a beamforming scheme will be described with reference to FIG. 1B.

Figure 1A:
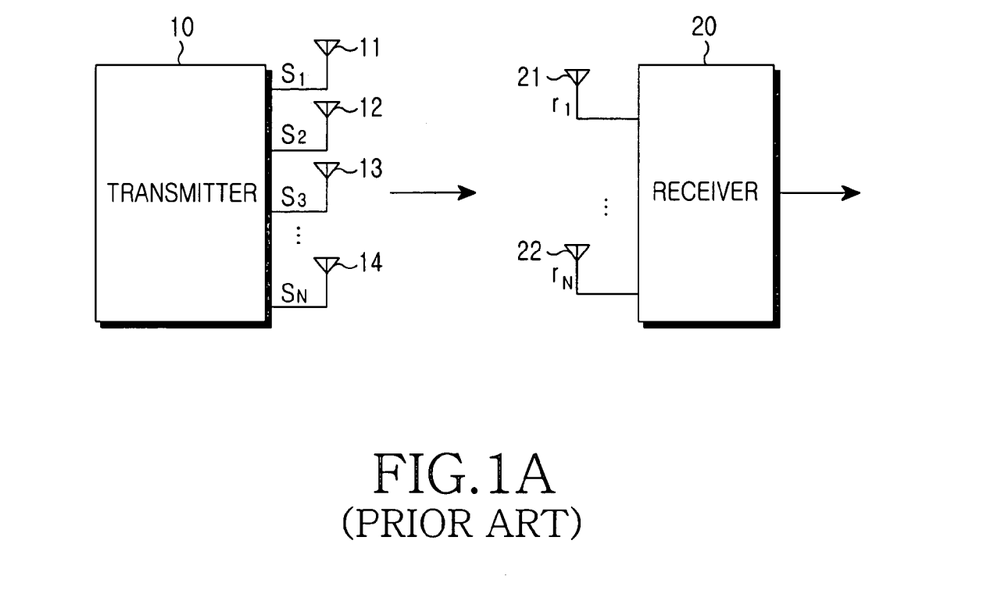
FIG. 1A is a block diagram illustrating a transmission construction of a transmitter according to the conventional spatial multiplexing scheme.

FIG. 1A is a block diagram illustrating a transmission construction of a transmitter according to the conventional spatial multiplexing scheme.

According to the spatial multiplexing scheme, as shown in FIG. 1A, a transmitter 10 including a plurality of transmission antennas 11, 12, 13, and 14 each simultaneously transmit different symbols $S_1, S_2, S_3, \ldots S_N$. That is, the transmission antenna 11 transmits symbol $S_1$, the transmission antenna 12 transmits symbol $S_2$, the transmission antenna 13 transmits symbol $S_3$, and the transmission antenna 14 transmits symbol $S_N$. Since the spatial multiplexing scheme transmits different symbols through multiple transmission antennas, it has a larger communication capacity than those of other MIMO schemes.

However, in general, the spatial multiplexing scheme is limited because the number of antennas for a transmitter must be smaller than the number of antennas for a receiver. This is because the receiver 20 uses a nulling and canceling detection scheme in connection with the application of the spatial multiplexing scheme. That is, in connection with the application of the spatial multiplexing scheme, it is possible that the receiver 20 performs low-complexity detection for the transmitted symbols only when the number of antennas for the receiver 20 is larger than that for the transmitter 10.

In contrast, in an actual mobile communication environment, the transmitter (i.e., base station) 10 has more antennas 11, 12, 13, and 14 than the receiver (i.e., mobile terminal) 20.

Therefore, when a base station using the spatial multiplexing scheme transmits data via a forward link, there is a limitation in the whole communication capacity of the mobile communication system due to the limited number of reception antennas of the mobile terminal, so that it is difficult to realize a transmitter according to the spatial multiplexing scheme.

Figure 1B:
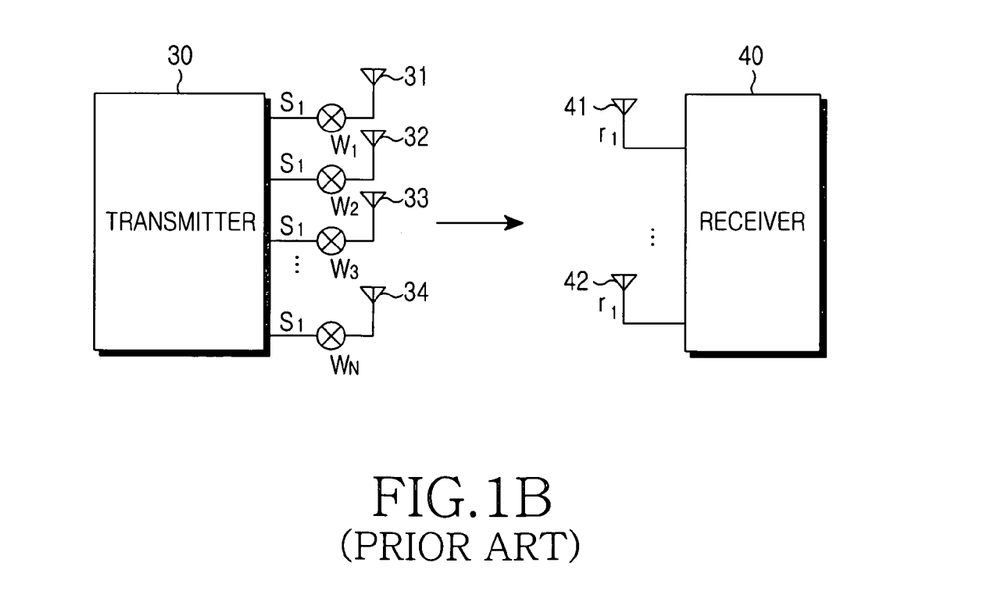
FIG. 1B is a block diagram illustrating a transmission construction of a transmitter according to the conventional beamforming scheme.

FIG. 1B is a block diagram schematically illustrating the construction of a transmitter with a beamforming scheme in a mobile communication system. According to the beamforming scheme, a transmitter 30 including a plurality of antennas 31, 32, 33, and 34, multiplies a plurality of the same symbols $S_1$ by different weight values $W_1, W_2, W_3, \ldots W_N$, and then transmits the symbols $S_1$ at the same time so that a receiver 40 may perform optimally.

In this case, there is an advantage in that a mobile terminal has good receiving performance of a symbol transmitted from a base station. But there is a disadvantage in that frequency efficiency is deteriorated because the same symbols ($S_1$) are simultaneously transmitted through a plurality of antennas. That is, the beamforming scheme has reduced communication capacity. Therefore, a transmission construction according to the above-mentioned beamforming scheme may deteriorate communication capacity of the next-generation mobile communication system, which will actually require faster data transmission rates.

SUMMARY OF THE INVENTION

Accordingly, the present invention has been made to solve the above-mentioned problems occurring in the prior art. It is therefore an object of the present invention to provide a method for grouping multiple transmission antennas to increase communication capacity in a mobile communication system which includes the multiple transmission antennas and multiple reception antennas.

Another object of the present invention is to provide a method for grouping transmission antennas adaptively to channels using a channel covariance matrix in a mobile communication system which includes the multiple transmission antennas and multiple reception antennas.

Still another object of the present invention is to provide a method for grouping multiple transmission antennas and transmitting symbols according to a spatial multiplexing scheme among the groups of the transmission antennas by a base station in a mobile communication system which includes the multiple transmission antennas and multiple reception antennas.

To accomplish these objects, in accordance with one aspect of the present invention, there is provided a method for grouping $N_t$ number of transmission antennas and transmitting a relevant symbol to $N_r$ number of reception antennas by a base station in a mobile communication system which includes the base station having the $N_t$ number of transmission antennas and a mobile terminal having the $N_r$ number of reception antennas, the method including: receiving a first matrix having a size of '$N_r \times N_t$', which corresponds to the $N_t$ number of transmission antennas, fedback from the mobile terminal, generating combinations of sub-matrixes of the first matrix corresponding to the $N_r$ number of reception antennas, and calculating sums of maximum eigenvalues; determining combinations of the sub-matrixes having a maximum value from among the calculated sums of eigenvalues to be transmission antenna groups for the $N_t$ number of transmission antennas; and transmitting different relevant symbols from each other through the transmission antenna groups. In accordance with another aspect of the present invention, there is provided a method for increasing communication capacity of a base station in a mobile communication system which includes the base station having a plurality of transmission antennas and a mobile terminal having a plurality of reception antennas, the method including: receiving a channel covariance matrix, which corresponds to the number of the transmission antennas, from the mobile terminal by the base station and generating combinations of transmission antennas corresponding to the reception antennas by the base station; determining combinations of transmission antennas having a maximum signal-to-noise rate from among the generated combinations of the transmission antennas to be the transmission antenna groups; and classifying the transmission antennas into relevant groups corresponding to the transmission antenna groups and simultaneously transmitting a signal according to the transmission antenna groups.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configurations incorporated herein will be omitted when it may obscure the subject matter of the present invention.

The present invention is proposed to provide a method grouping multiple transmission antennas by a base station in a mobile communication system which includes the multiple transmission antennas and multiple reception antennas.

Figure 2A:
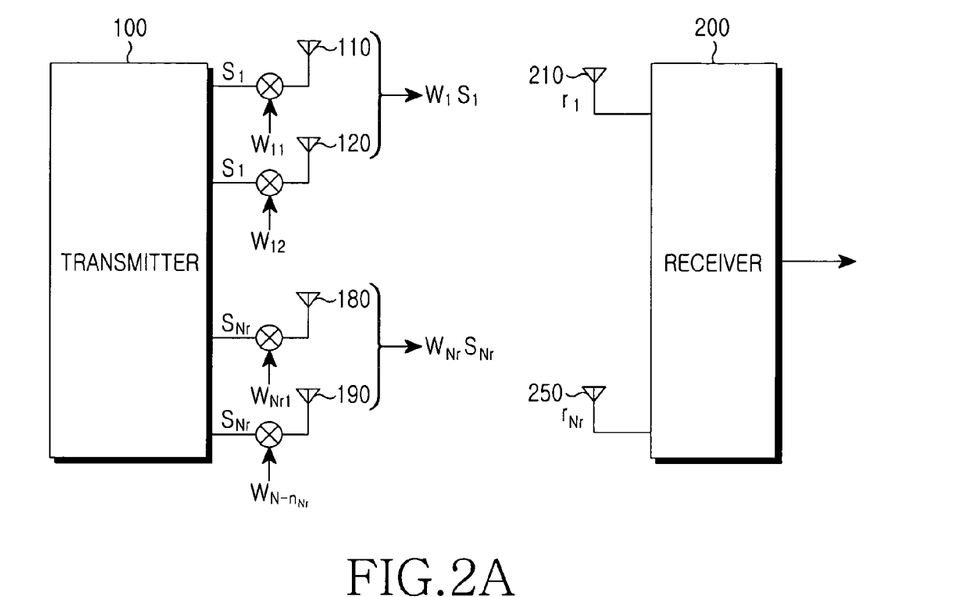
FIG. 2A is a block diagram illustrating a transmission construction of transmitter according to an embodiment of the present invention.
Figure 2B:
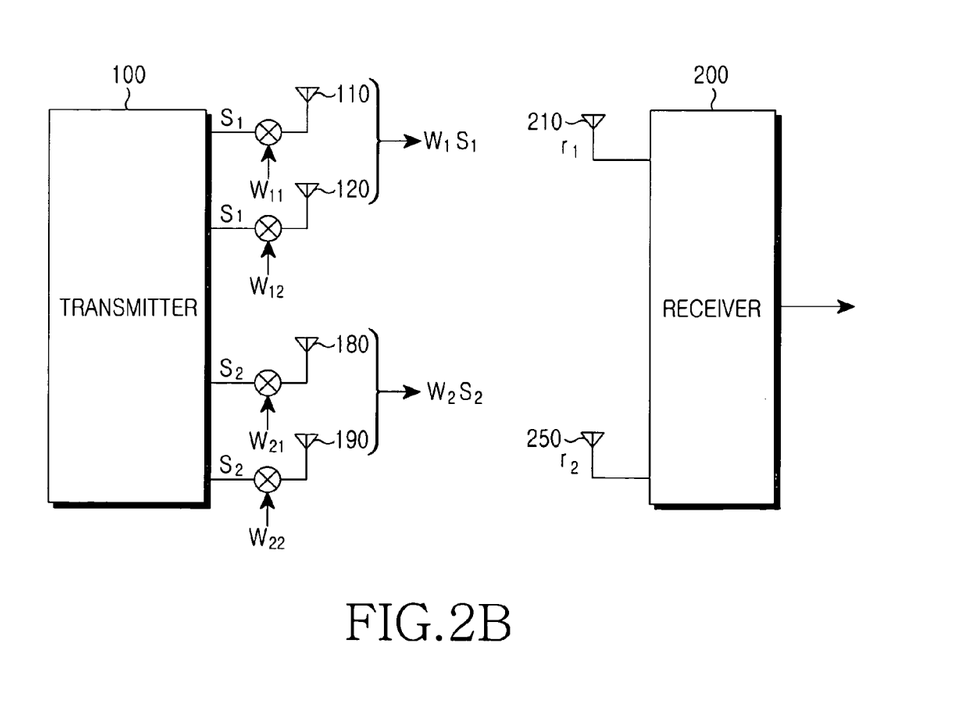
FIG. 2B is a block diagram illustrating a system including four transmission antennas and two reception antennas in the transmission construction shown in FIG. 2A.

The base station groups the multiple transmission antennas by a channel covariance matrix, transmits different symbols through different groups of transmission antennas, and transmits the same symbol through the same group of transmission antennas. That is, the base station transmits different symbols according to the groups, thereby increasing the communication capacity of the mobile communication system, and the base station assigns different weight values to the same symbols to be transmitted through transmission antennas included in each group, thereby improving the receiving performance of a mobile terminal. FIGS. 2A and 2B are block diagrams illustrating constructions of transmitter according to an embodiment of the present invention.

Referring to FIG. 2A, when a transmitter has $N_t$ number of transmission antennas and a receiver has $N_r$ number of reception antennas, $N_t$ is larger than $N_r$ in a forward link environment. In this case, the transmission antennas are classified into $N_r$ number of groups using channel covariance so as to maximize the communication capacity of the transmitter. That is, the transmission antennas are grouped by the same number as the number of reception antennas.

The channel covariance matrix is a channel value estimated by the receiver, or mobile terminal, and is transmitted as feedback information to the base station. The feedback information may include grouping information. However, when only the grouping information is transmitted, it is necessary for a receiver of the base station to perform a separate eigenvalue decomposition, thereby increasing the calculation burden on the receiver of the base station. Therefore, the mobile terminal transmits a channel covariance matrix estimated through the channel to the base station.

The channel covariance matrix according to $N_r$ is determined by the following Equation:

$$R = \begin{bmatrix} R_{11} & R_{12} & \cdots & R_{1N_r} \\ R_{21} & R_{22} & \cdots & R_{2N_r} \\ \vdots & \vdots & \ddots & \vdots \\ R_{N_r 1} & R_{N_r 2} & \cdots & R_{N_r N_r} \end{bmatrix} \quad (1)$$

where the covariance matrix 'R' includes '$N_r \times N_r$' number of sub-matrixes '$R_{ii}$', and each of the sub-matrixes is a '$N_i \times N_i$' matrix. Also, '$N_i$' represents the number of transmission antennas included in the $i^{th}$ group. After the maximum eigenvalues of the sub-matrixes '$R_{ii}$' are respectively calculated, the transmission antennas are grouped so that a sum of the calculated maximum eigenvalues may be determined.

This is expressed in the following Equation:

$$\underset{n_1,\ldots,n_{N_r}}{\arg\max} \sum_{i=1}^{N_r} \max(eig(R_{ii})) \text{ such that } \sum_{i=1}^{N_r} n_i = N_t \quad (2)$$

The maximum eigenvalues of the respective sub-matrices '$R_{ii}$' are calculated, and then the combination of transmission antennas that yield a maximum value are determined to create specific transmission antenna groups.

When the transmission antenna groups $N_1, N_2, N_3, \ldots N_N$ that have the maximum value of the sub-matrices '$R_{ii}$' are calculated as described above, received signals of a receiver, which are symbols transmitted through the transmission antenna groups, can be calculated by the following Equation 3:

$$r = Hs + n = \frac{1}{\sqrt{N_t}}[H_1 \; H_2 \; \cdots \; H_{N_r}]\begin{bmatrix} w_1 s_1 \\ w_2 s_2 \\ \vdots \\ w_{N_r} s_{N_r} \end{bmatrix} + n \quad (3)$$

where each '$H_i$' is an '$N_r \times n_t$' matrix, and each '$W_i$' is an 'Ni×1' beamforming weight vector in each group which represents an eigenvector corresponding to the maximum eigenvalue of the sub-matrix '$R_{ii}$'. Also, '$S_1$', '$S_2$', '$S_3$', . . . '$S_N$' represent transmission symbols to be transmitted through the transmission antennas, and 'n' represents noise.

An average power of a receiving signal received through the reception antenna equals:

$$E[r^H r \mid H] = \frac{1}{N_t}\sum_{i=1}^{N_r} W_i^H H_i^H H_i w_i E_s + \delta^2 I \quad (4)$$

where '$E_s$' represents an average power of a symbol, and $$H_i = \begin{bmatrix} h_1^H \\ \vdots \\ h_{N_r}^H \end{bmatrix}.$$

Substituting this value for $H_i$ into Equation 4 yields Equation 5

$$E[H_i^H H_i] = \sum_{j=1}^{N_r} E[h_j h_j^H] = \sum_{J=1}^{N_r} R_{ii} = N_r R_{ii} \quad (5)$$

where '$W_i$' is an eigenvector corresponding to the maximum eigenvalue of the channel covariance sub-matrix '$R_{ii}$', so that the maximum average power to the receiver becomes $$\frac{N_r}{N_t}\sum_{i=1}^{N_r} \lambda_i E_s,$$

and '$\lambda_i$' represents the maximum eigenvalue of the '$R_{ii}$'. Therefore, when the sum of the maximum eigenvalues of the channel covariance sub-matrix is maximized, so is the average power of the receiver.

To obtain the transmission antenna groups that provide the maximum average power as described above, the transmitter performs eigenvalue decomposition by a number of times equal to:

$$\frac{N_r^{N_t}}{N_r!} - \frac{(N_r-1)^{N_t}}{(N_r-1)!} - \cdots - \frac{1^{N_t}}{1!} \quad (6)$$

In this case, since the number of antennas of the receiver is small, '$N_r$' is also small. In effect, the amount of calculation of eigenvalue decomposition for the maximum average power becomes small as well. In addition, since the transmitter periodically performs the eigenvalue decomposition over a long time period in a channel environment having little change, complexity for calculating the maximum average power is also reduced.

In contrast, when the base station performs a grouping process of the transmission antennas according to an adjacent sequence of the transmission antennas, the eigenvalue decomposition is performed by a number of times determined by the Equation 7:

$$\begin{bmatrix} N_t - 1 \\ N_r - 1 \end{bmatrix} \quad (7)$$

This equation uses the fact that the channel correlation between transmission antennas physically located near each other is larger, so the number of times the eigenvalue decomposition is performed is reduced when compared to the case of equation 6.

To illustrate the operation of Equation 7, FIG. 2b shows a network in accordance with an embodiment of the present invention with four transmission antennas and two reception antennas. An entire covariance matrix of '4×4' exists because there are four transmission antennas. For this example, $N_t$=4 and $N_r$=2, so grouping with respect to adjacent transmission antennas according to the covariance matrix may be performed as follows.

First, in case 1, in accordance with known methods of solving differential equations, transmission antenna group #1 is a '1×1' matrix including '$R_{11}$' and transmission antenna group #2 is established to be a '3×3' matrix including '$R_{22}$', '$R_{23}$', '$R_{24}$', '$R_{32}$', '$R_{33}$', '$R_{34}$', '$R_{42}$', '$R_{43}$', and '$R_{44}$'.

That is, a transmission antenna 110 is put in transmission antenna group #1 and transmission antennas 120, 180, and 190 are put in transmission antenna group #2. Thereafter, eigenvalue decomposition is performed on transmission antenna group #1 and transmission antenna group #2. The resulting eigenvalue decompositions are added to establish the sum of the maximum eigenvalues of case 1.

In case 2, transmission antenna group #1 is a '2×2' matrix including '$R_{11}$' '$R_{12}$', '$R_{21}$', and '$R_{22}$' and transmission antenna group #2 is a '2×2' matrix including '$R_{33}$', '$R_{34}$', '$R_{43}$', and '$R_{44}$'. That is, transmission antennas 110 and 120 are put in transmission antenna group #1 and transmission antennas 180 and 190 are put in transmission antenna group #2. Thereafter, eigenvalue decomposition is performed on transmission antenna group #1 and transmission antenna group #2. The resulting eigenvalue decompositions are added to establish the sum of the maximum eigenvalues of case 2.

In case 3, transmission antenna group #1 is a '3×3' matrix including '$R_{11}$' '$R_{12}$', '$R_{13}$', '$R_{21}$', '$R_{22}$', '$R_{23}$', '$R_{31}$', '$R_{32}$', and '$R_{33}$' and transmission antenna group #2 is a '1×1' matrix including '$R_{44}$'. That is, transmission antennas 110, 120, and 180 are put in transmission antenna group #1 and transmission antenna 190 is put in transmission antenna group #2. Thereafter, eigenvalue decomposition is performed on transmission antenna group #1 and transmission antenna group #2. The resulting eigenvalue decompositions are added to establish the sum of the maximum eigenvalues of case 3.

As a result of comparing the respective eigenvalues of case 1, case 2, and case 3, if the eigenvalue of case 2 is the largest value, the base station configures transmission antenna groups according to case 2. That is, the base station groups the transmission antennas two in a group.

As shown in FIGS. 2A and 2B, the base station 100 includes four transmission antennas 110, 120, 180, and 190, and the mobile terminal 200 includes two reception antennas 210 and 25. Therefore, the mobile terminal performs a total of seven eigenvalue decomposition processes by Equation 6. In contrast, when only correlation of adjacent antennas is considered, it is possible that the mobile terminal performs a total of three eigenvalue decomposition processes by Equation 7.

The base station receives a covariance matrix as shown in the following equation, which is fedback from the mobile terminal, in consideration of the number of the transmission antennas 110, 120, 180, and 190.

$$R = \begin{bmatrix} 1 & \rho & \rho^2 & \rho^3 \\ \rho^* & 1 & \rho & \rho^2 \\ \rho^{*2} & \rho^* & 1 & \rho \\ \rho^{*3} & \rho^{*2} & \rho^* & 1 \end{bmatrix} \quad (8)$$

The fedback covariance matrix represents channel characteristics of signals transmitted through the respective antennas. According to the fedback covariance matrix, antennas are grouped to have the maximum eigenvalue sum and are then distributed to corresponding reception antennas 210 and 250. Therefore, the base station classifies the four transmission antennas into two groups, transmits simple 'S$_1$' through transmission antenna group #1 110 and 120, and transmits simple 'S$_2$' through transmission antenna group #2 180 and 190. In this case, in each transmission antenna group, the respective transmission antennas transmit different signals including a relevant symbol. That is, in transmission antenna group #1, the transmission antenna 110 transmits a signal obtained by multiplying symbol 'S$_1$' by weight value 'W$_{11}$' and the transmission antenna 120 transmits a signal obtained by multiplying symbol 'S$_1$' by weight value 'W$_{12}$'. Also, in transmission antenna group #2, the transmission antenna 180 transmits a signal obtained by multiplying symbol 'S$_2$' by weight value 'W$_{21}$' and the transmission antenna 190 transmits a signal obtained by multiplying symbol 'S$_2$' by weight value 'W$_{22}$'.

Therefore, transmission antennas in the same group transmit the same symbol according to the beamforming scheme even when channels have a high correlation to each other, to improve the performance of a receiver. In addition, although there are more transmission antennas in the base station than there are reception antennas in the mobile terminal, it is possible for the base station to have the best frequency efficiency because different symbols are transmitted from each transmission antenna according to the spatial multiplexing scheme. That is, the base station calculates channel correlation using a covariance matrix fedback from the mobile terminal according to the number of transmission antennas, performs antenna grouping adaptively to the calculated channel correlation, and transmits a symbol.

Therefore, although there are more transmission antennas in the base station than there are reception antennas in the mobile terminal, it is possible to detect a received signal by a nulling and canceling detection scheme having a small calculation amount. That is, although the base station has more antennas than the mobile terminal, the number of channels is the same as the number of reception antennas according to the grouping, so that it is possible to use the nulling and canceling detection scheme.

Figure 3A:
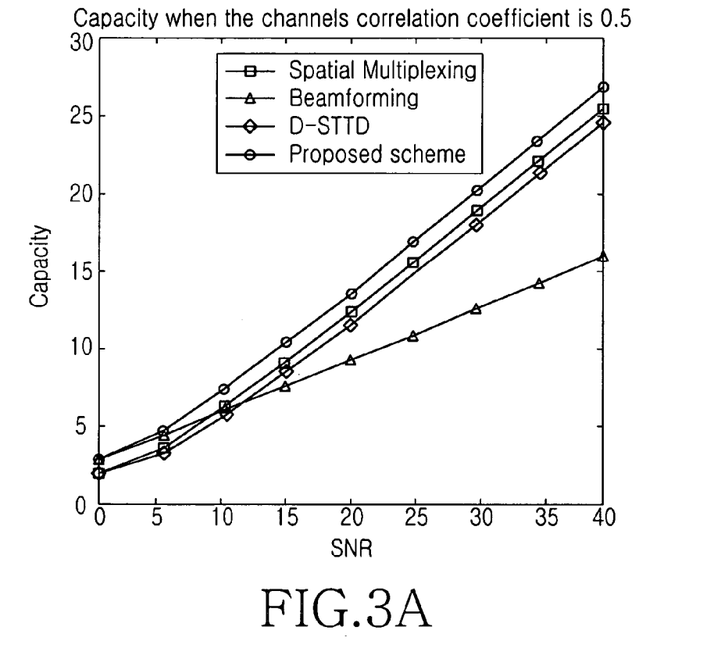
FIGS. 3A and 3B are graphs illustrating the channel capacity according to prior art and the channel capacity according to an embodiment of the present invention.
Figure 3B:
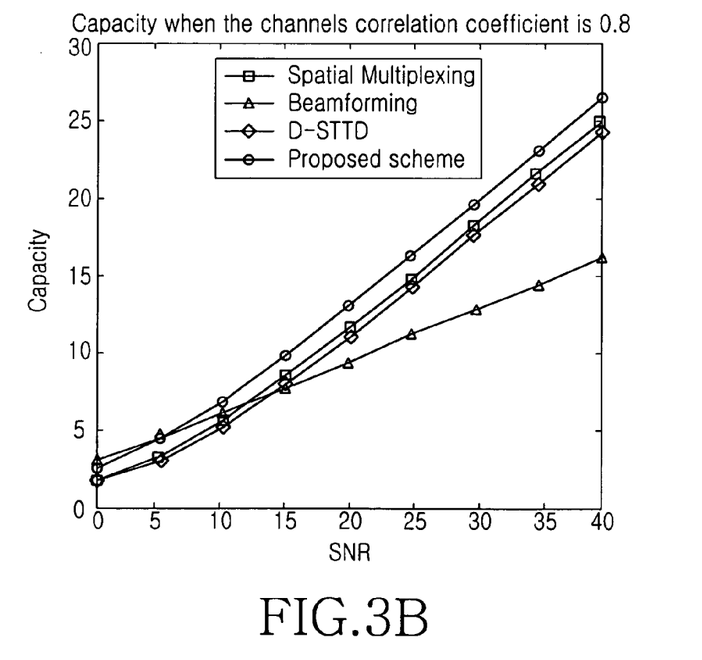

FIGS. 3A and 3B are graphs illustrating the channel capacity according to the prior art and the channel capacity according to an embodiment of the present invention.

When a base station transmits signals through transmission antennas, the maximum communication capacity may be determined by Equation 9 below. In this case, it is assumed that the base station does not receive channel information from a mobile terminal.

$$C = E\log_2 \det\left(I_{N_r TIMES N\_k} + \frac{SNR}{N_t} HQH^H\right) \quad (9)$$

where 'N$_t$' represents the number of transmission antennas of the base station, 'N$_r$' represents the number of reception antennas of the mobile terminal, and 'H' represents a channel matrix, indicating that signals transmitted from each of the transmission antennas are received to each of the reception antennas through different routes. In this case, 'H' is an 'N$_r$× N$_t$' matrix. Also, 'Q' is a matrix for representing covariance of a transmission signal in each transmission antenna, which is an 'N$_t$×N$_t$' matrix. In addition, 'SNR' represents a signal-to-noise ratio.

FIG. 3A shows channel capacities in a case in which 'ρ' is 0.5 and FIG. 3B shows channel capacities in a case in which 'ρ' is 0.8.

According to the construction for transmission of the present invention, the base station receives a channel covariance matrix feedback from the mobile terminal according to the number of transmission antennas, calculates channel correlation, performs antenna grouping adaptively to the calculated channel correlation, and transmits a symbol. Therefore, it can be confirmed that transmitting the same symbol through the same transmission antenna group assures good receiving performance, and transmitting different symbols from each other through different transmission antenna groups enables the mobile communication system to have a communication capacity equal to or greater than the prior spatial multiplexing scheme. In addition, it is evident that, in spite of the increase of channel correlation, the method of the present invention can provide a greater communication capacity than other MIMO schemes.

Figure 4A:
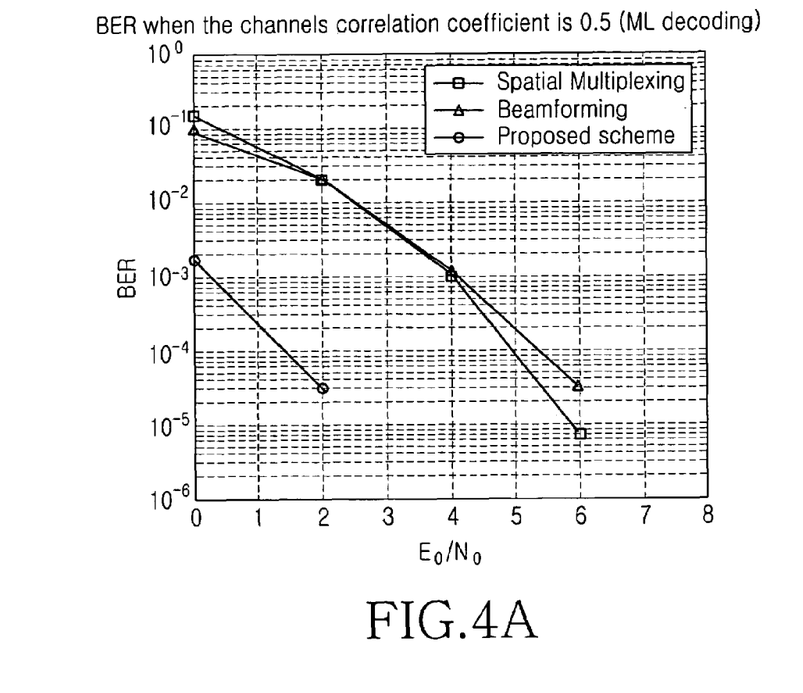
FIGS. 4A and 4B are graphs illustrating bit error rates detected according to a maximum likelihood detection scheme in a transmission construction according to an embodiment of the present invention.
Figure 4B:
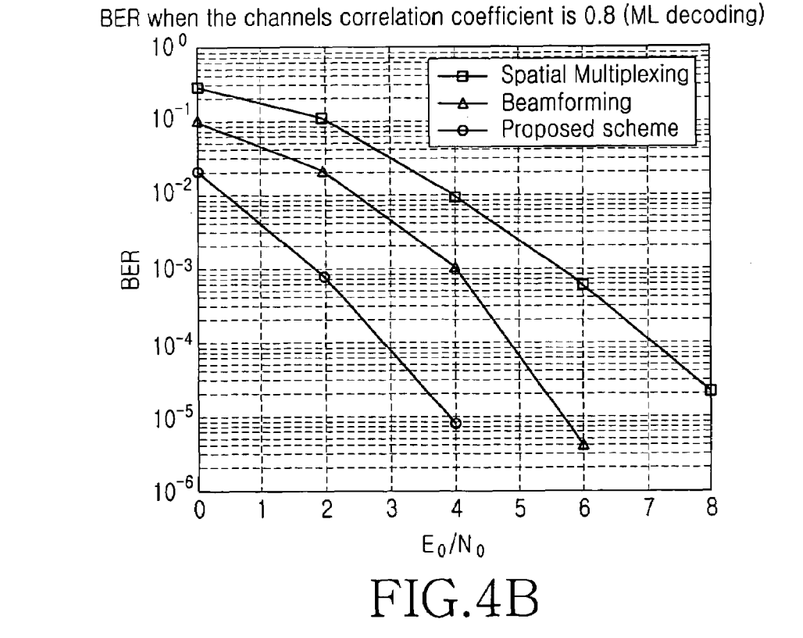

FIGS. 4A and 4B are graphs illustrating bit error rates detected according to a maximum likelihood detection scheme in a transmission scheme according to an embodiment of the present invention.

The graphs shown in FIGS. 4A and 4B represent the case when the base station has four transmission antennas and the mobile terminal has two reception antennas. Also, FIGS. 4A and 4B show bit error rates detected when a data transmission rate is 8 bit/c.u (R=8) (channel use), a constraint length is 9 (k=9), and a coding rate is ¼ (r=¼). In this case, maximum likelihood detection is a scheme for selecting a symbol having the minimum Squared Euclidean Distance by substituting symbols to be transmittable from all transmission antennas for a relevant function.

In order to obtain the data transmission rate of 8 bit/c.u (R=8), the transmission method according to the present invention uses 16QAM while the spatial multiplexing scheme uses QPSK and the beamforming scheme uses 256QAM.

The graphs of FIG. 4A are obtained through the maximum likelihood detection when 'ρ' is 0.5. The graphs of FIG. 4B are obtained through the maximum likelihood detection when 'ρ' is 0.8. As shown in FIGS. 4A and 4B, it is evident that the transmission construction according to the present invention has a lower bit error rate than the spatial multiplexing scheme and the beamforming scheme.

According to the transmission scheme of the present invention, different transmission antenna groups transmit different symbols, and transmission antennas included in the same group transmit the same symbol having different weight values from each other, thereby increasing an $E_b/N_o$ gain. In addition, it can be confirmed that the transmission construction of the present invention has superior receiving performance over any other MIMO construction, even though there is high channel correlation.

Figure 5A:
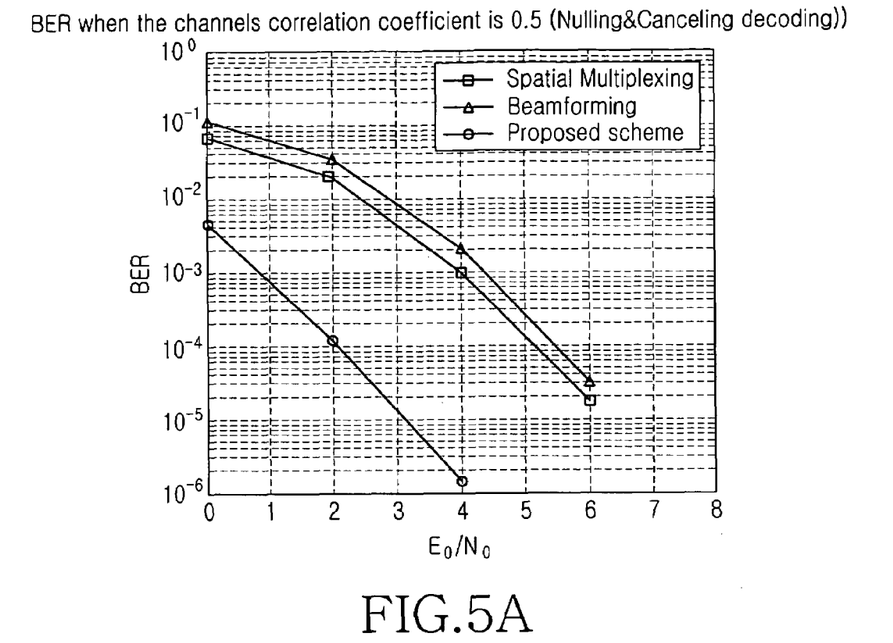
FIGS. 5A and 5B are graphs illustrating bit error rates detected when the nulling and canceling detection scheme is applied to the transmission construction according to an embodiment of the present invention.
Figure 5B:
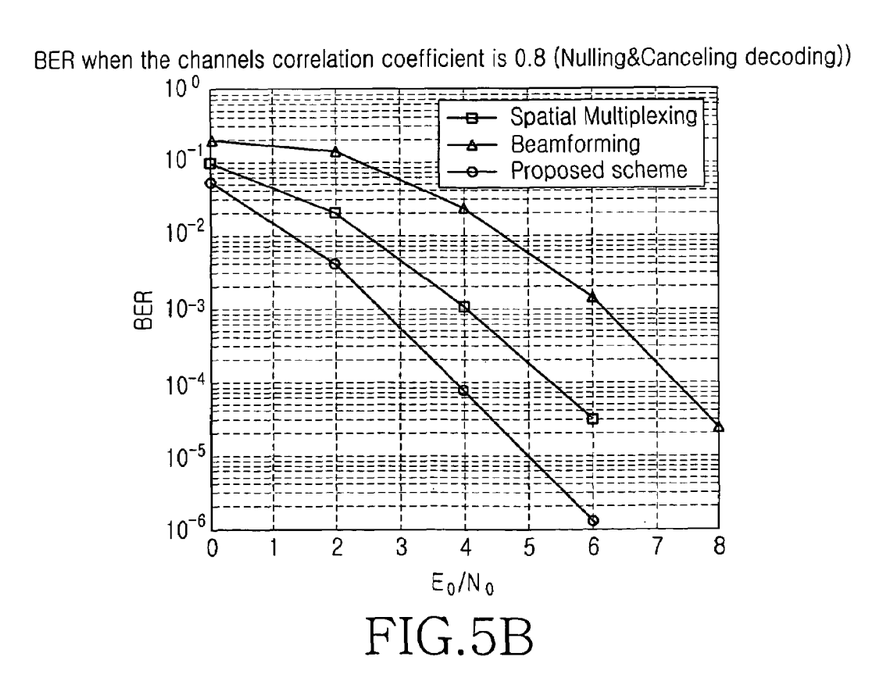

FIGS. 5A and 5B are graphs illustrating bit error rates detected when the nulling and canceling detection scheme is applied to the transmission construction according to an embodiment of the present invention.

That is, FIG. 5A shows bit error rates detected by the nulling and canceling detection scheme when 'ρ' is 0.5 and FIG. 5B shows bit error rates detected by the nulling and canceling detection scheme when 'ρ' is 0.8. In order to obtain the data transmission rate, the transmission method according to the present invention uses 16QAM while the beamforming scheme uses 256QAM and a double space-time transmit diversity scheme uses 16QAM. In addition, FIGS. 5A and 5B show bit error rates detected when a constraint length is 9 (k=9) and a coding rate is ¼ (r=¼).

It is possible to apply the nulling and canceling detection scheme to the transmission scheme of the present invention although the number of transmission antennas in the base station is larger than the number of reception antennas in the mobile terminal. That is, signal 'r' received according to the prior nulling and canceling detection scheme is calculated by the following Equation 10:

$$r = \frac{1}{\sqrt{N_t}} \sum_{i=1}^{N_r} H_i w_i s_i + n \quad (10)$$

Since $H_i w_i = a_i$, Equation 10 can be expressed as:

$$r = \frac{1}{\sqrt{N_t}} \sum_{i=1}^{N_r} a_i s_i + n \quad (11)$$

Therefore, it is possible to detect a received signal by using the nulling and canceling detection scheme.

Also, according to the transmission scheme of the present invention, channels according to the transmission antenna groups are designed independently of each other as much as possible so that different transmission antenna groups may transmit different symbols. Therefore, when detection is performed using the nulling and canceling scheme, the orthogonal probability between channels corresponding to different groups from each other increases, thereby removing a noise amplification effect.

Accordingly, the method according to the present invention provides an increased $E_b/N_o$ gain of approximately 1~2 dB as compared with the prior double space-time transmit diversity scheme (D-STTD).

Effects of the present invention, especially the effects obtained by the above-mentioned embodiments, will now be described.

The method according to the present invention can use a detection algorithm having a low complexity without the number of antennas of receiver. That is, it is possible to use an algorithm according to the conventional nulling and canceling scheme although the number of transmission antennas is larger than the number of receiving antennas. Therefore, the method according to the present invention has an advantage in that the entire transmission capacity of the mobile communication system increases without increasing the number of antennas in the receiver. In addition, the method of the present invention has another advantage in that the entire bit error rate can decrease by using an appropriate convolution code.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for grouping $N_t$ number of transmission antennas and transmitting a relevant symbol to $N_r$ number of reception antennas by a base station in a mobile communication system which includes the base station having the $N_t$ number of transmission antennas and a mobile terminal having the $N_r$ number of reception antennas, the method comprising the steps of:

receiving a first matrix having a size of '$N_r \times N_r$', which corresponds to the $N_r$ number of reception antennas, fedback from the mobile terminal;

generating combinations of sub-matrixes of the first matrix corresponding to the $N_r$ number of reception antennas, and calculating sums of maximum eigenvalues;

determining combinations of the sub-matrices have a maximum value from among the calculated sums of eigenvalues to be transmission antenna groups for the $N_t$ number of transmission antennas; and transmitting different relevant symbols from each other through the transmission antenna groups, and transmitting an equal relevant symbol though different transmission antennas in an equal transmission antenna group, wherein the combinations of the sub-matrices of the first matrix for the transmission antennas are obtained by measuring eigenvalues by a number of times calculated by, $$\frac{N_r^{N_t}}{N_r!} - \frac{(N_r-1)^{N_t}}{(N_r-1)!} - \cdots - \frac{1^{N_t}}{1!}.$$

2. The method as claimed in claim 1, wherein the combinations of the sub-matrices of the first matrix for adjacent transmission antennas of the transmission antennas are obtained by measuring eigenvalues by the number of times calculated by, $$\begin{bmatrix} N_t - 1 \\ N_r - 1 \end{bmatrix}.$$

3. A method for grouping $N_t$ number of transmission antennas and transmitting a relevant symbol to $N_r$ number of reception antennas by a base station in a mobile communication system which includes the base station having the $N_t$ number of transmission antennas and a mobile terminal having the $N_r$ number of reception antennas, the method comprising the steps of:

receiving a first matrix having a size of '$N_r \times N_r$', which corresponds to the $N_r$ number of reception antennas, feedback from the mobile terminal;

generating combinations of sub-matrixes of the first matrix corresponding to the $N_t$ number of reception antennas, and calculating sums of maximum eigenvalues;

determining combinations of the sub-matrices having a maximum value from among the calculated sums of eigenvalues to be transmission antenna groups for the $N_t$ number of transmission antennas; and transmitting different relevant symbols from each other through the transmission antenna groups, and transmitting an equal relevant symbol through different transmission antennas in an equal transmission antenna group, wherein the step of generating combinations of the sub-matrixes of the first matrix and calculating the eigenvalue includes the steps of:

calculating a first maximum eigenvalue of a first sub-matrix of the first matrix:

calculating a second maximum eigenvalue of a second sub-matrix of the first matrix: and adding the first maximum eigenvalue and the second maximum eigenvalue to represent the eigenvalue.

4. The method as claimed in claim 3, wherein combinations of sub-matrices having a maximum value from among the sums of the maximum eigenvalues of combinations of sub-matrices of the first matrix are determined to be transmission antenna groups for the $N_t$ number of transmission antennas, according to, $$\operatorname*{argmax}_{n_1,\ldots,n_{N_r}} \sum_{i=1}^{N_r} \max(eig(R_{ii})) \text{ such that } \sum_{i=1}^{N_r} n_i = N_t,$$

wherein $R_{ii}$ represents the sub-matrices of the first matrix and is $$\sum_{i=1}^{N_r} n_i = N_t.$$

5. A system for grouping $N_t$ number of transmission antennas and transmitting a relevant symbol to Nr number of reception antennas in a mobile communication system which includes a base station having the $N_t$ number of transmission antennas and a mobile terminal having the $N_r$ number of reception antennas, the base station for receiving a first matrix having a size of '$N_r \times N_r$', which corresponds to the $N_r$ number of reception antennas, feedback from the mobile terminal, generating combinations of sub-matrixes of the first matrix corresponding to the $N_r$ number of reception antennas, and calculating sums of maximum eigenvalues, determining combinations of the sub-matrices having a maximum value from among the calculated sums of eigenvalues to be transmission antenna groups for the $N_t$ number of transmission antennas, and transmitting different relevant symbols from each other through the transmission antenna groups, and transmitting an equal relevant symbol through different transmission antennas in an equal transmission antenna group, wherein the combinations of the sub-matrices of the first matrix for the transmission antennas are obtained by measuring eigenvalues by a number of times calculated by, $$\frac{N_r^{N_t}}{N_r!} - \frac{(N_r-1)^{N_t}}{(N_r-1)!} - \cdots - \frac{1^{N_t}}{1!}.$$

6. The system as claimed in claim 5, wherein the combinations of the sub-matrices of the first matrix for adjacent transmission antennas of the transmission antennas are obtained by measuring eigenvalues by the number of times calculated by, $$\begin{bmatrix} N_t - 1 \\ N_r - 1 \end{bmatrix}.$$

7. A system for grouping $N_t$ number of transmission antennas and transmitting a relevant symbol to $N_r$ number of reception antennas in a mobile communication system which includes a base station having the $N_t$ number of transmission antennas and a mobile terminal having the $N_r$ number of reception antennas, the base station for receiving a first matrix having a size of '$N_r \times N_r$', which corresponds to the $N_r$ number of reception antennas, feedback from the mobile terminal, generating combinations of sub-matrixes of the first matrix corresponding to the $N_r$ number of reception antennas, and calculating sums of maximum eigenvalues, determining combinations of the sub-matrices having a maximum value from among the calculated sums of eigenvalues to be transmission antenna groups for the $N_t$ number of transmission antennas, transmitting different relevant symbols from each other through the transmission antenna groups, and transmitting an equal relevant symbol through different transmission antennas in an equal transmission antenna group, wherein the transmitter calculates a first maximum eigenvalue of a first sub-matrix of the first matrix, calculates a second maximum eigenvalue of a second sub-matrix of the first matrix, and adds the first maximum eigenvalue and the second maximum eigenvalue to represent the eigenvalue.

8. The system as claimed in claim 7, wherein combinations of sub-matrices having a maximum value from among the sums of the maximum eigenvalues of combinations of sub-matrices of the first matrix are determined to be transmission antenna groups for the $N_t$ number of transmission antennas, according to, $$\operatorname*{argmax}_{n_1,\ldots n_{N_r}} \sum_{i=1}^{N_r} \max(eig(R_{ii})) \text{ such that } \sum_{i=1}^{N_r} n_i = N_t,$$

wherein $R_{ii}$ represents the sub-matrices of the first matrix and is $$\sum_{i=1}^{N_r} n_i = N_t.$$

* * * * *